US006480865B1

(12) United States Patent
Lee et al.

(10) Patent No.: US 6,480,865 B1
(45) Date of Patent: Nov. 12, 2002

(54) FACILITY FOR ADDING DYNAMISM TO AN EXTENSIBLE MARKUP LANGUAGE

(75) Inventors: Susan B. Lee, San Francisco, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/166,042

(22) Filed: Oct. 5, 1998

(51) Int. Cl.[7] ............................................. G06F 17/21

(52) U.S. Cl. ..................... 707/523; 707/512; 707/513

(58) Field of Search ............................... 707/513, 530, 707/523, 10, 512

(56) References Cited

U.S. PATENT DOCUMENTS

| | | | | |
|---|---|---|---|---|
| 4,447,875 A | | 5/1984 | Bolton et al. ............... 364/200 |
| 4,599,691 A | | 7/1986 | Sakaki et al. ............... 364/419 |
| 4,949,253 A | | 8/1990 | Chigira et al. .............. 364/200 |
| 5,269,014 A | | 12/1993 | Ogino ......................... 395/500 |
| 5,321,606 A | | 6/1994 | Kuruma et al. ........ 364/419.08 |
| 5,530,863 A | * | 6/1996 | Hino ........................... 395/700 |
| 5,548,508 A | | 8/1996 | Nagami |
| 5,629,846 A | | 5/1997 | Crapo |
| 5,659,729 A | * | 8/1997 | Nielsen ....................... 395/603 |
| 5,715,453 A | * | 2/1998 | Stewart ....................... 395/615 |
| 5,915,259 A | | 6/1999 | Murata |
| 5,940,075 A | * | 8/1999 | Mutschler, III et al. .... 345/335 |
| 6,014,680 A | | 1/2000 | Sato et al. |
| 6,055,522 A | | 4/2000 | Krishna et al. |
| 6,073,143 A | | 6/2000 | Nishikawa et al. |
| 6,182,092 B1 | * | 1/2001 | Francis et al. .............. 707/513 |
| 6,202,072 B1 | | 3/2001 | Kuwahara |
| 6,226,642 B1 | * | 5/2001 | Beranek et al. .............. 707/10 |
| 6,272,673 B1 | * | 8/2001 | Dale et al. ..................... 717/1 |
| 6,336,124 B1 | * | 1/2002 | Alam et al. ................. 707/523 |

OTHER PUBLICATIONS

Willner, Eki. "Preparing Web data with XML: Part III" Information Today. vol. 15, Issue 7, Jul./Aug. 1998, pp. 1–6.*

Bray, Tim and Sperberg–McQueen, C.M. "Extensible Markup Language (XML):Part I. Syntax" http://www.w3.org/TR/WD–xml–970331, pp. 1–40.*

Bray, Tim. Name Spaces in XML, published Jan. 1998, pp. 1–14, http://www.w3.org/TR/1998/NOTE–xml–names–0119.*

Bray, Tim, "Document Content Description for XML" Http://www.w3.org/TR/Note–dcd, Jul. 31, 1998, pp. 1–21.

Senna, Jeff, "XML Bridges the Gap" *Info World*, Jun. 1, 1998, vol. 20, Issue 22, pp. 88–90.

Jones C., IBM, Developers: Java : Library—Papers, "Bean-Machine for the Web",http://review.software.ibm.com/developer/library/beanmachine.html, Jan. 1998, 2pp.

"SGML Tool: One document, several formats" *Computer World*, Microstar Software Ltd., Sep. 9, 1996, vol. 30, Issue 37, pp. 58.

Microsoft Corporation, "Dynamic HTML Overview," 1998, Internet article available at http://www.microsoft.com/workshop/author/dhtml/dhtmlovw.asp (3 pages).

Sun Microsystems, Inc., "Servlet Specification—Version 2.1," 1995–98, Internet article available at http://java.sun.com/products/servlet/2.1/index.html (2pages).

(List continued on next page.)

*Primary Examiner*—Joseph H. Feild
(74) *Attorney, Agent, or Firm*—Gates & Cooper LLP (57) ABSTRACT

A method for annotating eXtensible Markup Language (XML) documents with dynamic functionality. The dynamic functionality comprises invocations of Java objects. These annotations belong to a different name space, and thus a Dynamic XML-Java (DXMLJ) processor recognizes elements within the XML document that are tagged with DXMLJ prefix tags, processes each of these tags, and transforms the XML document accordingly.

54 Claims, 2 Drawing Sheets

OTHER PUBLICATIONS

W3C (MIT, INRIA, Keio), "Extensible Markup Language (XML) 1.0," 1998, Internet article available at http://www.w3.org/TR/REC–xml (41 pages).

W3C (MIT, INRIA, Keio), "Namespaces in XML," 1998, Internet article available at http://www.w3.org/TR/WD–xml–names (11 pages).

Aho, Alfred V. et al., "Efficient String Matching: An Aid to Bibliographic Search," Communications of the ACM, 1975, pp. 333–340.

Budinsky, F.J., et al, "Automatic Code Generation from Design Patterns," IBM Systems Journal, vol. 35, No. 2, 1996, pp. 151–171.

Ramesh, R et al., "Non–linear Pattern Matching in Trees," Journal of the Association for Computing Machinery, vol. 39, No. 2, Apr. 1992, pp. 295–316.

* cited by examiner

FIG. 1

FACILITY FOR ADDING DYNAMISM TO AN EXTENSIBLE MARKUP LANGUAGE

CROSS-REFERENCE TO RELATED APPLICATIONS

This application is related to the following co-pending and commonly-assigned patent applications:

application Ser. No. 09/166,018, entitled "A PATTERN MATCHING AND REPLACEMENT LANGUAGE FOR TRANSFORMING DOCUMENTS," filed on Oct. 5, 1998, by Neelakantan Sundaresan, pending; and application Ser. No. 09/166,043, entitled "CONVERTING SCHEMAS TO COMPONENT MODELS," filed on Oct. 5, 1998, by Neelakantan Sundaresan, pending; both of which applications are incorporated by reference herein.

BACKGROUND OF THE INVENTION

1. Field of the Invention.

This invention relates in general to transforming documents, and in particular, to a facility for adding dynamism to extensible Markup Language (XML) documents.

2. Description of Related Art.

Since the early days of the Internet, and specifically, the World Wide Web (WWW), HyperText Markup Language (HTML) has been used by Web servers to create marked up documents or pages for display by browsers. Subsequently, a number of different techniques have been introduced to add dynamism to HTML.

For example, when a browser requests an HTML page that has one or more embedded APPLET tags, a Java program identified by the APPLET tag is downloaded from the server and executed by the browser. Similarly, when a browser requests an HTML page that has one or more embedded SERVLET tags, a Java object identified by the SERVLET tag is executed by the server to perform one or more functions before the HTML page being downloaded to the browser. These functions typically return tagged structures that are then embedded in the HTML page at the position of the SERVLET tags.

In another example, Java Server Pages (JSPs) and Active Server Pages (ASPs) are HTML pages that include embedded programming or scripts. This embedded programming or scripts is then invoked by the server and the results are embedded in the HTML page prior to the HTML page being downloaded to the browser. In addition, Cascading Style Sheets (CSS's) and Java scripts provide additional dynamism in the browser.

Notwithstanding the success of HTML, Extensible Markup Language (XML) is poised to be the next big revolution for the World Wide Web (WWW). With the realization that the Web is not about just browsing any more, XML has emerged as an enabling technology to carry the Web to the next generation of electronic commerce, Web-based workflow, and integration of databases with Web applications.

The XML language describes a class of data objects called XML documents and partially describes the behavior of computer programs that process them. XML is a restricted form of SGML, the Standard Generalized Markup Language, defined in ISO 8879. The specification for XML can be found at the URL: http://www.w3.org/TR/REC-xml.

Unlike HTML, XML is a balanced tag language, wherein every open tag has a corresponding closed tag and there are no semantics attached to the tag. The interpretation of the tags is left to the target environment using the document. Thus, XML separates a document description from its interpretation.

This is a big deviation from HTML where the set of tags are fixed. Thus, XML enables applications to communicate between themselves using specialized tags. Moreover, the XML documents may change between applications without ever being rendered.

An XML document has two parts: (1) the marked up document; and (2) the document schema. XML documents are made up of storage units called entities, which contain either parsed or unparsed data. Parsed data is made up of characters, some of which form character data, and some of which form markup. Markup encodes a description of the document's storage layout and logical structure.

XML schemas specify constraints on the structures and types of elements in an XML document. The basic schema for XML is the DTD (Document Type Definition). Other XML schema definitions are also being developed, such as DCD Document Content Definition), XSchema, etc. Information concerning DTD and DCD can be found at the URL: http://www.w3.org/.

The main difference between DTD and DCD is that DTD uses a different syntax from XML, while DCD specifies an XML schema language in XML itself. (XSchema is similar to DCD in this respect). In spite of the differences in the syntax, the goals and constraint semantics for all these XML schema languages are the same. Their commonality is that they all describe XML Schema. This means that they assume the common XML structure, and provide a description language to say how these elements are laid out and are related to each other.

There are about five basic constraints that an XML schema describe:

1. The attributes that an element should/may contain:
    a. the types of the attribute values (mainly string types), and
    b. the mandatory or optional nature of occurrences of these attributes.
2. The type and the order in which elements can be contained inside another element (the content model of the element):
    a. the sub-element should of a certain name or type or that a subelement could be of any type, and
    b. a regular expression system to express how these elements occur, wherein this regular expression system can be expressed by the following operators:
        i. |: A|B (either element of type A or of type B can occur),
        ii. ,: A, B (element of type B follows one of type A),
        iii. *: A* (zero or more occurrence of element of type A),
        iv. +: A+ (One or more occurrence of element of type A),
        v. ?: A? (zero or one occurrence of element of type A), and
        vi. ( ): ( . . . ) (grouping of expressions in this system).

Note that this system includes some convenience operators. For example, A+ is the same as A, A*.

A software module called an XML processor is used to read XML documents and provide access to their content and structure. It is assumed that an XML processor is doing its work on behalf of another module, called the application. The XML specification located at the URL noted above describes the required behavior of an XML processor in terms of how it must read XML data and the information it must provide to the application.

In a typical application that uses XML for a particular specification, there would be a DTD that specifies the XML schema and one or more XML documents that satisfy that schema. Consider the following XML document example:

```
<?xml version="x1.0"?>
<!DOCTYPE test SYSTEM "foo.dtd">
<foo>
   <level1>
      <nest1 id="2"/>
      <nest2 id="3"/>
   </if>
   </level1>
</foo>
```

The corresponding DTD schema for the above example XML document would be the following:

```
<!ELEMENT foo (level1)>
<!ELEMENT level1 (nest1|nest2)>
<!ELEMENT nest1 EMPTY>
<!ATT LIST nest1
   id CDATA #REQUIRED>
<!ELEMENT nest2 EMPTY>
<!ATTLIST nest2
   id CDATA #REQUIRED>
```

The DTD schema indicates that the XML document "foo" has one tag "level1." Within level1, there are two tags "nest1" and "nest2," wherein both nest1 and nest2 have an attribute "id," whose value is character data, and whose specification is mandatory.

As an XML document flows through the various nodes of the Internet, the XML document may be fully or partially filled in, transformed, pruned, or composed at every node. This gives rise to the notion of valid versus well-formed documents. A valid XML document is one that satisfies the restrictions of its associated DTD schema. A well-formed XML document may not have or satisfy an associated DTD schema, but it has to satisfy the syntax requirements of XML (e.g., every open tag has a matching closing tag, etc.). Often, however, it is expensive to verify the XML document against the DTD schema.

In the use of a common language like XML, sufficient dynamism is needed where XML documents can be automatically transformed, with the transformed XML document replacing the original portion of the document in-place. Such transformations may be applied to one or several parts of the document based on one or more conditions, the transformations may split one or more parts of the document into multiple parts, the transformations may invoke an arbitrary function to replace a part of the document with another, etc.

However, XML itself does not provide any mechanisms to perform such transformations, since XML documents are by themselves static in nature. There is no way to embed logic, or specify filtering, or specify transformation structures that are based upon the context in which the document is processed. Moreover, the concepts of applets and servlets as used in HTML are limited in that the APPLET and SERVLET tags occur at the leaf level of the HTML page, which means that there is no way to embed anything within an APPLET or SERVLET tag. What is needed, then, is a mechanism that seamlessly mixes programming language constructs with the constructs of XML so that one can reference and enable the other. Moreover, such mechanisms should exploit the fact that XML does not attach any specific semantics to its tags.

SUMMARY OF THE INVENTION

To overcome the limitations in the prior art described above, and to overcome other limitations that will become apparent upon reading and understanding the present specification, the present invention discloses a method for annotating XML documents with dynamic functionality. The dynamic functionality comprises invocations of Java objects. These annotations belong to a different name space, and thus a Dynamic XML-Java (DXMLJ) processor recognizes elements within the XML document that are tagged with DXMLJ prefix tags, processes each of these tags, and transforms the XML document accordingly.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The preferred embodiment of the present invention describes a technique to annotate XML documents with dynamic functionality. In the preferred embodiment, this dynamic functionality comprises invocations of Java objects. These annotations belong to a different name space than the original XML document, and so a Dynamic XML-Java (DXMLJ) processor recognizes elements within the XML document that are tagged with DXMLJ prefix tags, processes each of these tags, and transforms the XML document accordingly.

Hardware Environment

Figure 1:
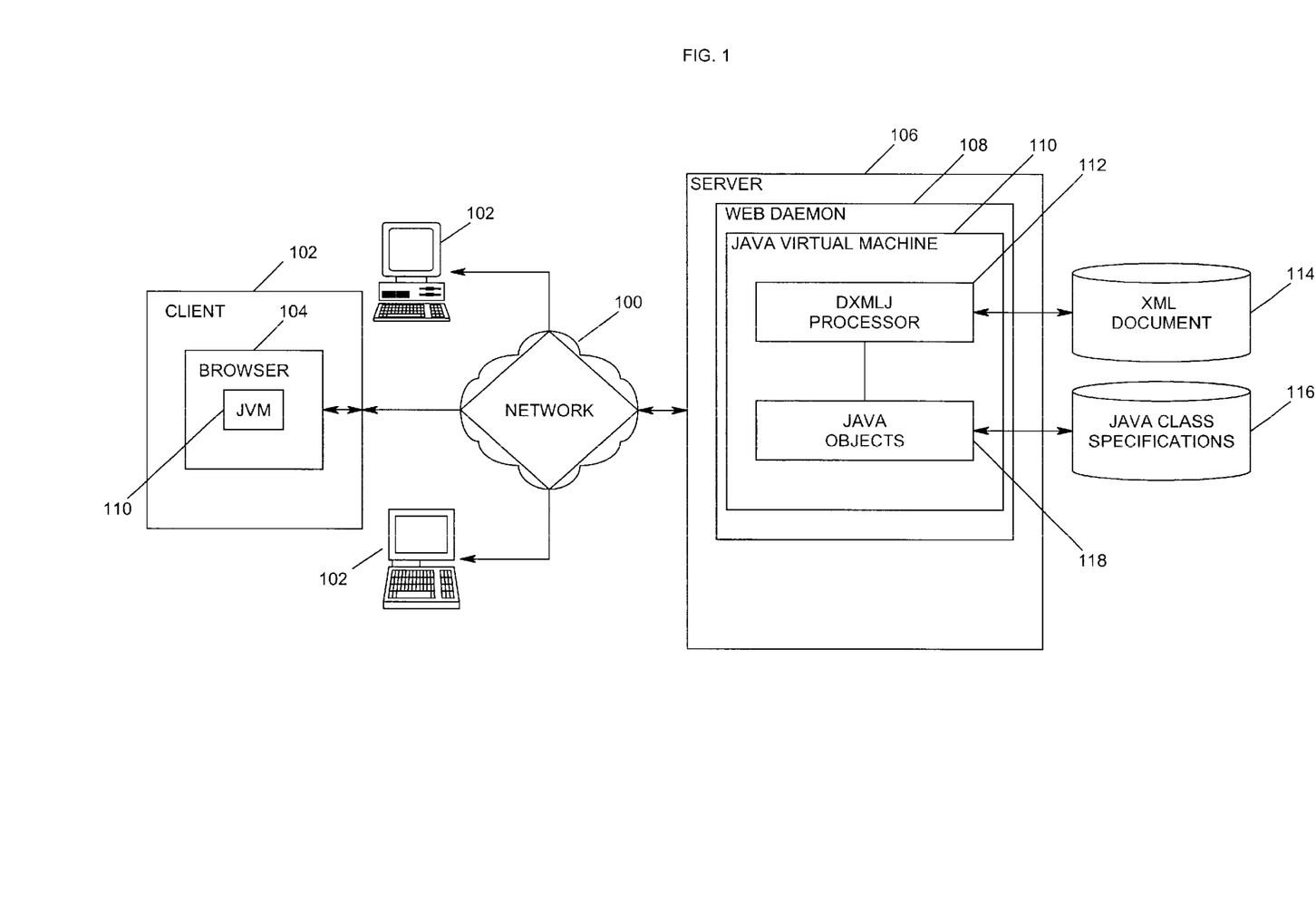
FIG. 1 is a block diagram that illustrates an exemplary client-server hardware environment of the preferred embodiment of the present invention.

FIG. 1 schematically illustrates an exemplary hardware environment that could be used in the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as LANs, WANs, SNA networks, as well as the Internet. Either or both of the Web browser 104 and Web daemon 108 may include a Java Virtual Machine (JVM) 110 that executes Java objects, applets, scripts, etc.

The preferred embodiment of the present invention is comprised of a number of different components. A Dynamic XML-Java (DXMLJ) processor 112 recognizes elements within a XML document 114 that are tagged with "dxmlj" prefix tags, processes each of these tags, and transforms the XML document 114 accordingly. This processing may include the instantiation of one or more Java class specifications 116 as Java objects 118, wherein the Java class specifications 116 and Java objects 118 comprise functions that transform the XML document 114.

In general, the DXMLJ processor 112, XML document 114, Java class specifications 116, and Java objects 118 comprise data and/or instructions which, when read, interpreted, and/or executed by the server computer 106, cause the computer 106 to perform the steps for performing and/or using the present invention. Generally, the data and/or instructions are embodied in and/or readable from a device, carrier or media, such as memory, data storage devices, and/or remote devices coupled to the computer via a data communications device.

Figure 2:
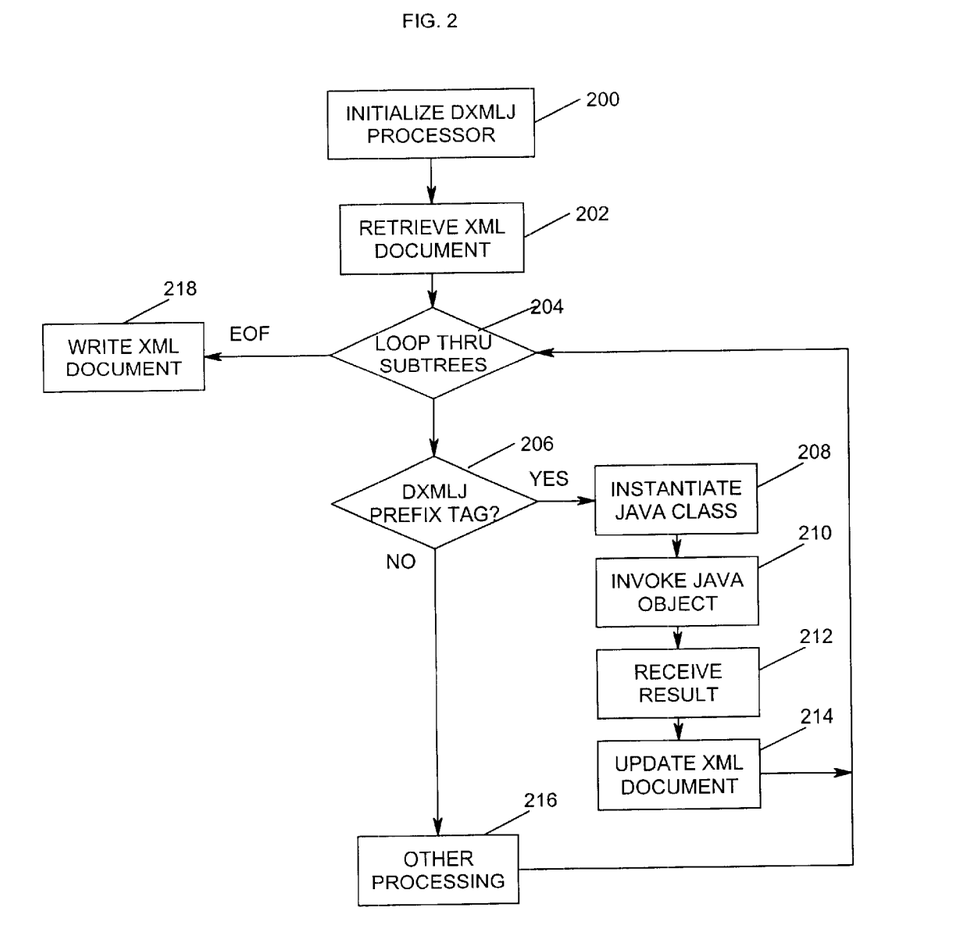
FIG. 2 is a flowchart that illustrates the logic performed by the preferred embodiment of the present invention.

However, those skilled in the art will recognize that the exemplary environment and components illustrated in FIGS. 1 and 2 are not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

Operation of the Invention

Four categories of transformations are defined in the preferred embodiment of the present invention:

1. Map functions (apply, execute),
2. Copy functions (clone),
3. Filter functions (select, filter), and
4. Permutation functions (reverse, rotate, shuffle).

These four categories of transformations are represented by tags in the annotation language used by the DXMLJ processor 112. A typical structure is provided below:

<prefix TAG
  prefix:id=" ... "
  prefix:class=" ... "
  prefix:arg=" ... "
  prefix:href=" ... "
  prefix:num=" ... "
  prefix:replace=" ... ">
  ... sub-elements ...
</prefix:TAG>

The placeholder TAG represents a convenience tag, which are described in more detail below.

The prefix is specified as a DXMLJ processor 112 instruction at the top of the subtree within the XML document 114. If not, by default, the prefix dxmlj is chosen as the annotation prefix.

The six typical prefixes have the following semantics (all the attributes are optional):

1. The prefix:id attribute uniquely identifies the annotation element.
2. The prefix:arg attribute is used to refer to a node identified using the prefix:id attribute.
3. The prefix:class attribute uniquely identifies a class to instantiate and execute.
4. The prefix:href attribute specifies a Uniform Resource Identifier (URI) from which an XML tree is to obtained and processed. The URI has to be well-formed. This attribute may also be used for referring to another subtree with a particular prefix:id within the same document. An xpointer language string may be placed here, which allows a reference to an arbitrary XML element traversal.
5. The prefix:num attribute specifies DXMLJ processor 112 operations that require an integer argument.
6. The prefix:replace attribute is a "true" or "false" attribute, wherein "true" indicates that the annotation is to be replaced by the result of the annotation processing and "false" indicates that the annotation remains.

The tag language is comprised of tags that permit arbitrary tree and subtree nodes within an XML document 114 to be processed and transformed. It is possible that almost all of the functionalities can be provided by a simple tag that is processed into a call to a Java object 118 that includes logic for traversing, searching, and manipulating a tree or subtree within the XML document 114.

The preferred embodiment of the present invention also provides convenience tags that enable commonly used and simple operations. These convenience tags reference class specifications 116 that represent generic operations. It is believed that all search and transformation operations can be expressed in terms of these generic operations.

In the preferred embodiment, the convenience tags are grouped into four classes:

1. Map functions for applying a Java function object 118 to one or more elements,
2. Clone functions for creating copies of XML subtrees,
3. Filter functions for filtering XML subtrees from a group of candidate subtrees, and
4. Permutation functions for performing permutation operations on a group of XML trees.

Each of these functions are described in more detail below.

Map Functions

Map functions are used to transform an XML tree or subtree by applying a Java function object 118. There are two tags in this category: apply and execute. These tags are described in more detail below.

Apply Function

The syntax of the apply tag is provided below:

<dxmlj:apply
  class=" ... Java class name ... "
  arg=" ... reference to a node with a particular dxmlj:ID ... "
  href=" ... a URI or an Xpointer reference ... "
    (only one of href or arg can occur)
  replace="true/false">
  ... body of the apply function
</dxmlj:apply>

The Java class name identifies a Java class specification 116 for a Java unary function object 118 that accepts a TXElement object as an argument. The TXElement object is applied to each child of the annotation. If the annotation is specified with an arg or href attribute, then the annotation is applied to the node retrieved from those tags. The replace tag specifies whether the annotation should be replaced or not.

An example using the apply tag is provided below:

<dxmlj:apply
  class="DollarsToPounds"
  replace="true">

```
<employee-info
    name="John"
    wage="10000"
    unit="dollars"/>
<employee-info
    name="Peter"
    wage="9000"
    unit="dollars"/>
</dxmlj:apply>
```

In the above example, the unary function "DollarsToPounds" is applied to each of the two employee-info elements. The apply element itself is replaced by the transformed children.

Execute Tag

The syntax of the execute tag is provided below:

```
<dxmlj:execute
    class=" ... Java predicate class name ... "
    arg=" ... reference to a node with a particular dxmlj:ID
        ... "
    href=" ... a URI or an Xpointer reference ... "
        (only one of href or arg can occur)
    replace="true/false">
    ... body of the execute function
</dxmlj:execute>
```

The class attribute identifies a Java predicate class specification 116, and the corresponding Java predicate function object 118 is applied to each of the children of this annotation or the node specified in the arg or href attributes. The children (or the node) for which the predicate is true, are picked and any underlying transformation specified in the child node is applied to it.

The execute tag is related to the apply tag and the filter tag discussed below. However, it differs from the apply tag in the sense that each of the children might have a different transformation operation, whereas all children undergo the same transformation operation in the apply tag.

Clone Functions

Clone functions are used to make copies of an XML tree or subtree by applying a java function object 118. There is one tag in this category: clone. This tag is described in more detail below.

The syntax of the clone tag is provided below:

```
<prefix:clone
    class=" ... "
    num=" ... "
    replace=" ... ">
```

The num attribute specifies how many times the element tree under consideration has to be cloned. The class attribute specifies a Java class specification 116 that identifies a Java unary function object 118 that returns an integer. Only one of the class or num attributes can occur. When the class attribute is present, the associated Java unary function object 118 is invoked and the return value (which is an integer) is used to see how many clones of the element or elements under consideration have to be produced.

Filter Functions

Filter functions are used to select one or more XML subtrees or elements by applying a Java function object 118. There are two tags in this category: filter and select. These tags are described in more detail below.

Filter Tag

The syntax of the filter tag is provided below:

```
<prefix:filter
    class=" ... "
    arg=" ... "
    href=" ... "
    replace=" ... ">
```

The Java class specification 116 identified in the class attribute is a predicate class that is applied to all the elements under consideration, and only those for which it evaluates to "true" are selected. The filter tag can be considered as a special case of an execute tag where each of the elements selected undergo an identity transformation.

Select Tag

The syntax of the filter tag is provided below:

```
<prefix:select
    class=" ... "
    num=" ... "
    replace=" ... ">
```

The Java class specification 116 identified by the class attribute indicates a predicate. This is applied to each of the children until the first child that satisfies the condition is found or until all the elements are exhausted. The candidate element replaces the annotation node, if the replace flag is true. Alternatively, when the num attribute is specified, this selects the num-th element in the collection.

Permutation Functions

Permutation functions are used to permute a collection of elements by applying a Java function object 118. There are three tags in this category: permute, reverse, and rotate. These tags are described in more detail below.

Permute Tag

The syntax of the permute tag is provided below:

```
<prefix:permute
    class=" ... "
    arg=" ... "
    href=" ... "
    replace=" ... ">
```

The permute class corresponds to a Java unary function object 118 that returns an array of integers which is the permutation vector. This array is then used to permute the collection of elements under consideration.

Reverse Tag

The syntax of the reverse tag is provided below:

```
<prefix:reverse
    arg=" ... "
    href=" ... "
    replace =" ... ">
```

Reverse is a special case of permute, where a collection of elements in consideration are reversed in order.

Rotate Tag

The syntax of the rotate tag is provided below:

```
<prefix:rotate
    class=" ... "
    num=" ... "
    arg=" ... "
    href=" ... "
    replace=" ... ">
```

Rotate is a special case of permute where the elements are rotated a fixed number of times. This number is determined by the num attribute (which should be an integer) or by the class attribute which specifies a Java unary function object 118 that returns an integer.

Inline Programming

It may be useful to have inline programming within XML documents 114. In the preferred embodiment, the DXMLJ processor 112 allows users to include inline Java programming in their XML documents 114 using the dxmlj:inline elements. The content model for inline elements is PCDATA, which means that the user can have free flowing text in the body of the element. In order that the text not include characters that are XML tag characters like (<, > etc.), the user may enclose the text in CDATA tags.

The inline Java programming has two facilities to interact with the surrounding XML elements.

1. The programming can refer to other XML elements in the document 114 which have a specified dxmlj:ID in them. The way the programming would refer to the surrounding elements would be through the $(id) tag. Since ID tags are expected to be unique this provides for unique addressing of XML elements. This address returns a TXElement object. Subelements, attributes, descendents can be accessed within the Java programming. The $( ) tag language can be extended to search for elements and attributes which satisfy particular conditions.
2. The programming also has the facility to inject element subtrees back into the XML documents 114. This is done using a call to Java return call within the logic of the text.

An example of inline Java programming is provided below:

```
<employee-info>
    <name> . . . </name >
    <salary dxmlj:id="salary" value="100000"/>
    <dxmlj:inline>
        TXAttribute attr=$(salary).getAttribute("value");//1
        int salary=attr.getValue( );//2
        float perks=salary*0.15;//3
        TXElement perks=new TXElement("perks");//4
        perks.addAttribute("value", String.valueOf(perks));//5
        return txa;;//6
    </dxmlj:inline>
</employee-info>
```

When the DXMLJ processor 112 processes the dxmlj:inline element, it first pre-processes the body of the inline element to replace all the $( . . . ) references. One of the ways the inline programming is handled is by having the DXMLJ processor 112 convert each inline tag occurrence in the document 114 to a method in the Java class specification 116, wherein the method name is automatically generated. All the variables declared in the inline programming are local to the method.

Following is a sample translation for the dxmlj:inline set forth above:

```
TXElement_generatedMethod(TXElement el)
{
    TXAttribute attr= . . . get element from the document whose id is "salary"//1
    int salary=attr.getValue( );//2
    float perks=salary*0.15;//3
    TXElement perks=new TXElement("perks");//4
    perks.addAttribute("value", String.valueOf(perks));//5
    return txa;///6
}
```

The argument that is passed to the method is the reference to the node that is specified in the href or the arg attribute of the annotation. The annotation can itself be identified using the id attribute. The id attribute applies to the element tree that corresponds to this annotation (if the annotation tree is replaced by the return value of the programming, then the id identifies the replaced node). Replacement can be turned on and off using the replace attribute.

Sometimes, inline programming occurring in two different locations in the XML document 114 need to share variables between them. Since each occurrence of dxmlj:inline is converted to a method body, there is a Java class wrapping them that can have field variables which can be set and obtained in these methods. To assist, another tag called dxmlj:decl is introduced. All declarations within dxmlj:decl are placed in the body of the class that is generated.

Following is an example of this tag:

```
<dxmlj:decl>
    int referenceCount;
</dxmlj:decl>
```

The above example would result in a field called referenceCount being generated and this variable can be referenced in any of the Java programming that is enclosed in dxmlj:inline elements.

Relationship To Servlets, Java Server Pages, Etc.

As mentioned before, servlets, Java Server Pages, and Active Server Pages work only in a server-browser environment. For a general workflow environment, which is not just about viewing but about flowing application or business logic, XML documents 114 are used and the DXMLJ processor 112 enhances the use of XML documents 114.

Further, annotations processed by the DXMLJ processor 112 blend well with the document 114 tags, not just at the leaf level. Thus, document 114 tags can placed within DXMLJ processor 112 tags and vice versa. At the same time, they do not interfere with the document 114 tags, because they belong to a different name space than the DXMLJ processor 112 tag.

The DXMLJ processor 112 also allows embedding inline Java programming, sharing of state or variable information between these programmings occurring at different locations in the document 114 tree. In fact, the inline programming can be implemented any number of different programming languages, such as Java Script, VisualBasic Script, etc., so long as an interpreter for the language can be invoked. Further, the DXMLJ processor 112 tags can be embedded in HTML pages as well, since HTML is just an instance of XML.

Logic of the Invention

FIG. 2 is a flowchart that illustrates the steps performed by the preferred embodiment of the present invention.

Block 200 represents the DXMLJ processor 112 being initialized.

Block 202 represents the DXMLJ processor 112 retrieving the XML document 114.

Block 204 is a decision block that represents the DXMLJ processor 112 loop to examine all the subtrees within the XML document 114. Thereafter, Blocks 206–218 are performed.

Block 206 is a decision block that represents the DXMLJ processor 112 determining whether the subtree being examiner comprises a DXMLJ prefix tag. If so, control transfers to Block 208; otherwise, control transfers to Block 216.

Block 208 represents the DXMLJ processor 112 instantiating the Java class specification 116 associated with the DXMLJ prefix tag. This step is optional, in that the class may have already been instantiated. In addition, this step may represent the instantiation of a class that is comprised of inline programming within the XML subtree.

Block 210 represents the DXMLJ processor 112 invoking the Java object 118 instantiated from the Java class specification 116.

Block 212 represents the DXMLJ processor 112 receiving a result from the Java object 118.

Block 214 represents the DXMLJ processor 112 updating the XML subtree in the XML document 114 with the results received from the Java object 118. Thereafter, control transfers to Block 204.

Block 216 represents the DXMLJ processor 112 performing other processing. Thereafter, control transfers to Block 204.

Finally, Block 218 represents the DXMLJ processor 112 writing out the updated XML document 114.

Conclusion

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific document or programming languages, and could comprise languages other than XML and Java. For example, the present invention could also be used with HTML, SGML, NetRexx, VisualBasic Script, XML, Perl, C, C++, Cobol, etc.

In summary, the present invention discloses a method, apparatus, and article of manufacture for annotating XML documents with dynamic functionality. The dynamic functionality comprises invocations of Java objects. These annotations belong to a different name space, and thus a Dynamic XML-Java (DXMLJ) processor recognizes elements within the XML document that are tagged with DXMLJ prefix tags, processes each of these tags, and transforms the XML document accordingly.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for transforming an eXtensible Markup Language (XML) document, comprising:
   (a) identifying, in a computer, one or more annotations within the XML document, wherein:
      (i) the XML document is specified in a fist namespace;
      (ii) the annotations are specified in a second namespace within the XML document that is different from the fist namespace;
      (iii) a dynamic processor in the computer is configured to identify the annotations as belonging to the second namespace;
   (b) the dynamic processor invoking, in the computer, one or more functions associated with the identified annotations belonging to the second namespace, wherein:
      (i) the functions perform one or more transformations on the XML document to produce a transformed XML document;
      (ii) the transformed XML document replaces one or more portions of the XML document; and
      (iii) the transformed XML document can be processed by an XML processor.

2. The method of claim 1, wherein the annotations comprise tags within the XML document.

3. The method of claim 1 above, wherein the functions are defined in Java.

4. The method of claim 1, wherein the invoking step further comprises the step of instantiating one or more class specifications corresponding to the functions as one or more objects.

5. The method of claim 4, wherein the class specifications comprise Java class specifications and the instantiated class specifications comprise Java objects.

6. The method of claim 1 above, wherein the transformations comprise one or more replacements to be made in the XML document.

7. The method of claim 1 above, wherein the transformations are performed based on an evaluation of one or more conditions.

8. The method of claim 7 above, where the conditions comprise one or more predicates.

9. The method of claim 1 above, wherein the conditions include one or more filters.

10. The method of claim 1 above, wherein the functions comprise one or more functions selected from a group comprising map functions, copy functions, filter functions, and permutation functions.

11. The method of claim 1 above, wherein the functions are represented by tags in the annotation language.

12. The method of claim 1 above, wherein the annotations include an identification attribute that uniquely identifies the annotation.

13. The method of claim 1 above, wherein the annotations include a class identifier attribute that uniquely identifies a class specification for the function.

14. The method of claim 1 above, wherein the annotations include a reference identification attribute that uniquely identifies a location of the XML document.

15. The method of claim 1 above, wherein the annotations include an integer attribute that uniquely identifies an argument for the annotation.

16. The method of claim 1 above, wherein the annotations include an replace attribute that identifies whether the annotation is to be replaced by the transformation.

17. The method of claim 1 above, wherein the annotations comprise one or more convenience tags that represent generic operations to be performed on the XML document.

18. The method of claim 1 above, wherein the annotations comprise inline programming.

19. An apparatus for transforming an eXtensible Markup Language (XML) document, comprising:
   (a) a computer; and
   (b) dynamic processor means, performed by the computer, for identifying one or more annotations within the XML document, wherein:
      (i) the XML document is specified in a first namespace;
      (ii) the annotations are specified in a second namespace within the XML document that is different from the first namespace;
      (iii) the dynamic processor means is configured to identify the annotations as belonging to the second namespace; and
      (iv) the dynamic processor is configured to invoke one or more functions associated with the identified annotations belonging to the second namespace, wherein:
         (1) the functions perform one or more transformations on the XML document to produce a transformed XML document;
         (2) the transformed document replaces one or more portions of the XML document; and
         (3) the transformed document can be processed by an XML processor.

20. The apparatus of claim 19, wherein the annotations comprise tags within the XML document.

21. The apparatus of claim 19 above, wherein the functions are defined in Java.

22. The apparatus of claim 19, wherein the means for invoking comprises means for instantiating one or more class specifications corresponding to the functions as one or more objects.

23. The apparatus of claim 22, wherein the class specifications comprise Java class specifications and the instantiated class specifications comprise Java objects.

24. The apparatus of claim 19 above, wherein transformations comprise one or more replacements to be made in the XML document.

25. The apparatus of claim 19 above, wherein the transformations are performed based on an evaluation of one or more conditions.

26. The apparatus of claim 25 above, wherein the conditions comprise one or more predicates.

27. The apparatus of claim 19 above, wherein the conditions include one or more filters.

28. The apparatus of claim 19 above, wherein the functions comprise one or more functions selected from a group comprising map functions, copy functions, filter functions, and permutation functions.

29. The apparatus of claim 19 above, wherein the functions are represented by tags in the annotation language.

30. The apparatus of claim 19 above, wherein the annotations include an identification attribute that uniquely identifies the annotation.

31. The apparatus of claim 19 above, wherein the annotations include a class identifier attribute that uniquely identifies a class specification for the function.

32. The apparatus of claim 19 above, wherein the annotations include a reference identification attribute that uniquely identifies a location of the XML document.

33. The apparatus of claim 19 above, wherein the annotations include an integer attribute that uniquely identifies an argument for the annotation.

34. The apparatus of claim 19 above, wherein the annotations include an replace attribute that identifies whether the annotation is to be replaced by the transformation.

35. The apparatus of claim 19 above, wherein the annotations comprise one or more convenience tags that represent generic operations to be performed on the XML document.

36. The apparatus of claim 19 above, wherein the annotations comprise inline programming.

37. An article of manufacture embodying logic for performing a method for transforming an eXtensible Markup Language (XML) document, the method comprising:
(a) identifying, in a computer, one or more annotations within the XML document, wherein:
  (i) the XML document is specified in a first namespace;
  (ii) the annotations are specified in a second namespace within the XML document that is different from the first namespace;
  (iii) a dynamic processor in the computer is configured to identify the annotations as belonging to the second namespace; and
(b) the dynamic processor invoking, in the computer, one or more functions associated with the identified annotations belonging to the second namespace, wherein:
  (i) the functions perform one or more transformations on the XML document to produce a transformed XML document;
  (ii) the transformed XML document replaces one or more portions of the XML document; and
  (iii) the transformed XML document can be processed by an XML processor.

38. The article of manufacture of claim 37, wherein the annotations comprise tags within the XML document.

39. The article of manufacture of claim 37 above, wherein the functions are defined in Java.

40. The article of manufacture of claim 37, wherein the invoking step further comprises the step of instantiating one or more class specifications corresponding to the functions as one or more objects.

41. The side of manufacture of claim 40, wherein the class specifications comprise Java class specifications and the instantiated class specifications comprise Java objects.

42. The article of manufacture of claim 37 above, wherein the transformations comprise one or more replacements to be made in the XML document.

43. The article of manufacture of claim 37 above, wherein the transformations are performed based on an evaluation of one or more conditions.

44. The article of manufacture of claim 43 above, wherein the conditions comprise one or more predicates.

45. The article of manufacture of claim 37 above, wherein the conditions include one or more filters.

46. The article of manufacture of claim 37 above, wherein the functions comprise one or more functions selected from a group comprising map functions, copy functions, filter functions, and permutation functions.

47. The article of manufacture of claim 37 above, wherein the functions are represented by tags in the annotation language.

48. The article of manufacture of claim 37 above, wherein the annotations include an identification attribute that uniquely identifies the annotation.

49. The article of manufacture of claim 37 above, wherein the annotations include a class identifier attribute that uniquely identifies a class specification for the function.

50. The article of manufacture of claim 37 above, wherein the annotations include a reference identification attribute that uniquely identifies a location of the XML document.

51. The article of manufacture of claim 37 above, wherein the annotations include integer attribute that uniquely identifies an argument for the annotation.

52. The article of manufacture of claim 37 above, wherein the annotations include an replace attribute that identifies whether the annotation is to be replaced by the transformation.

53. The article of manufacture of claim 37 above, wherein the annotations comprise one or more convenience tags that represent generic operations to be performed on the XML document.

54. The article of manufacture of claim 37 above, wherein the annotations comprise inline programming.

* * * * *